United States Patent [19]

Mason

[11] Patent Number: 5,209,871
[45] Date of Patent: May 11, 1993

[54] SELF-SEALING LIQUID ELECTROLYTE USEFUL IN ELECTROCHROMIC DEVICE

[75] Inventor: Claude F. Mason, Ypsilanti, Mich.

[73] Assignee: Ford Motor Company, Dearborn, Mich.

[21] Appl. No.: 620,518

[22] Filed: Nov. 28, 1990

[51] Int. Cl.⁵ .................................... H01B 1/00
[52] U.S. Cl. .................................... 252/500
[58] Field of Search .............. 252/500; 429/188, 189, 429/192, 198

[56] References Cited

U.S. PATENT DOCUMENTS

| | | | |
|---|---|---|---|
| 4,060,311 | 11/1977 | Green | 350/160 R |
| 4,215,917 | 8/1980 | Giglia et al. | 350/357 |
| 4,322,272 | 3/1982 | Mita et al. | 204/159.1 B |
| 4,426,474 | 1/1984 | Sommer et al. | 524/243 |
| 4,547,310 | 10/1985 | Kasanami et al. | 252/511 |
| 4,737,422 | 4/1988 | Knight et al. | 429/192 |
| 4,786,667 | 11/1988 | Shimizu et al. | 523/435 |
| 4,882,243 | 11/1989 | Skotheim et al. | 429/182 |
| 5,016,991 | 5/1991 | Masoul | 350/357 |
| 5,051,211 | 9/1991 | Ward et al. | 429/192 |

*Primary Examiner*—Mark L. Bell
*Assistant Examiner*—A. Wright
*Attorney, Agent, or Firm*—Lorraine S. Melotik; Roger L. May

[57] ABSTRACT

This invention is directed to a self-sealing, polyether-functional liquid electrolyte useful in an electrochromic device. The electrolyte comprises the reaction product of a polyether polyamine and a mono-epoxide hydrolyzable silane. The polyether polyamine and the mono-epoxide silane are preferably reacted in amounts so as to provide at least about 2 molecules of mono-epoxide silane per molecule of polyether polyamine.

21 Claims, 1 Drawing Sheet

5,209,871

SELF-SEALING LIQUID ELECTROLYTE USEFUL IN ELECTROCHROMIC DEVICE

BACKGROUND OF THE INVENTION

Field of the Invention

This invention is directed to moisture curable polyether-functional liquid electrolytes and a method for making same. More particularly, the electrolyte comprises the reaction product of materials comprising a polyether polyamine and mono-epoxide hydrolyzable silane.

Discussion of the Related Art

Electrochromic devices are devices in which a physical/chemical change produced in response to the induced electric field results in a change in the reflective or transmissive properties of the device with respect to electromagnetic radiations, e.g., UV, visible and IR radiations. Such devices include a film of electrochromic material and an ion-conductive insulating layer which functions as an electrolyte layer. The film and the electrolyte layer are in surface contact with each other for exchange of ions between the electrochromic film and the electrolyte layer. Two conductive electrode layers, at least one of them being transparent, are disposed on the opposite outer surfaces of the electrochromic material film and the electrolyte layer to provide means for applying a voltage across the combined thickness of the electrochromic film and the electrolyte layer. The electrode layers, are provided on substrates, which substrates may be of a material such as glass. Depending on the ion providing and ion storage capacity of ion conductive layer, a counter electrode located between ion conductive layer and electrode layer may be used. The electrodes are provided with external electrical leads connected to a voltage providing source. Application of a voltage of proper polarity across the electrodes causes coloration of the electrochromic layer. By reversing the polarity of the applied voltage, the colored electrochromic layer will be uncolored (bleached). Changing from the bleached state to the colorless state or from the colored state to the bleached is termed "switching". The electrochromic material may be persistent in either its colored state or its non-colored state. By "persistent" is meant the ability of the material to remain, after removal of the electric field, in the absorptive state to which it is changed, as distinguished from a substantially instantaneous reversion to the initial state. The length of time a material is persistent is called its "open circuit memory" or simply "memory". Electrochromic devices of this type have been described for several uses, such as for image display, for light filtering, etc.

In such devices, the electrochromic film usually comprises an inorganic metal oxide material, most commonly a transition metal oxide, in particular tungsten oxide. When tungsten oxide is the electrochromic material, the electrolyte layer is adapted to provide a positively charged light metal cation, preferably, a proton or a lithium ion.

The electrolyte layer is generally a liquid electrolyte solution, typically based on sulfuric acid or lithium perchlorate in propylene carbonate. However, use of a liquid electrolyte has the inherent disadvantage associated with containment of a fluid. That is, it is required with liquid electrolytes used in layered electrochromic devices that the edges of the device be sealed so as to retain the liquid electrolyte. In addition, cell components such as the Preferred tungsten oxide electrochromic material as well as certain electrode materials are attacked by acidic electrolyte materials, limiting the utility of strong acids for this application. Similar problems exist with gel electrolytes, such as the sulfuric acid-polyvinyl alcohol electrolyte gel.

Solid electrolytes form another class of electrolytes suggested for use in electrochromic devices. Solid electrolyte of complex halides are known, particularly iodides, of silver with alkali metal or quaternary ammonium ions, e.g., $RbAg_4I_5$. Additionally, solid electrolytes may comprise aluminum compounds such as sodium beta-alumina and potassium beta-alumina. However, these electrolytes are all typically expensive to prepare and, in the case of the alumina compounds, could not be formed directly on components of an electrochromic device since they require very high processing temperatures. Others have suggested forming a solid electrolyte comprising a sheet of porous glass impregnated with a solid, ion-conductive silver or alkali metal compound. One disadvantage of employing such an impregnated glass sheet is that, because it is a solid of limited flexibility, it would be difficult to assemble the component layers of an electrochromic device and achieve the intimate contact required between this sheet and the adjacent layers.

It would be highly desirable to provide a liquid electrolyte useful in an electrochromic device which has excellent ionic conductivity and, because it is a liquid, the ability to intimately contact even irregularly shaped surfaces. It would be desirable that such a liquid electrolyte, however, not subject cell components to chemical attack as takes place with acidic liquid electrolytes and avoid problems with its containment.

The aforementioned problems of prior art electrolytes are overcome by the self-sealing, polyether-functional liquid electrolyte of the present invention.

SUMMARY OF THE INVENTION

This invention is directed to a polyether-functional liquid electrolyte, adapted for use in an electrochromic device. The electrolyte crosslinks when exposed to moisture so as to be capable of self-sealing at the edges of an electrochromic device. The polyether-functional liquid electrolyte of this invention comprises the reaction product of materials comprising: (i) liquid polyether polyamine having at least two reactive amine groups and containing polyether groups, and (ii) liquid mono-epoxide hydrolyzable silane having at least one hydrolyzable group attached to a silicon atom. The polyether polyamine and mono-epoxide hydrolyzable silane are reacted in amounts so as to provide at least about 2 molecules of the mono-epoxide hydrolyzable silane per molecule of the polyether polyamine. Preferably, the polyether polyamine is a polyether diamine, and both of the amine groups are primary amine groups. Preferably, the electrolyte additionally comprises an alkali metal salt dopant.

According to still another aspect of the invention, this invention is directed to a method for making the polyether-functional liquid electrolyte disclosed above, which method comprises: combining materials comprising (i) liquid polyether polyamine having at least two reactive amine groups and containing polyether groups, and (ii) liquid mono-epoxide hydrolyzable silane having at least one hydrolyzable group attached to a silicon atom to form a reaction mixture, the polyether polyamine and mono-epoxide hydrolyzable silane being employed in amounts in the reaction mixture which provide at least about 2 molecules of the mono-epoxide hydrolyzable silane per molecule of the polyether polyamine, and mixing the reaction mixture for a time at a temperature sufficient to cause reaction of the materials to form the polyether-functional liquid electrolyte. The method may further comprise mixing alkali metal salt into the reaction mixture, optionally dissolved in an organic solvent. If solvent is incorporated into the reaction mixture, it would preferably be removed from the electrolyte prior to its use in an electrochromic device.

This invention, in still another aspect, is directed to an electrochromic device comprising two substrates and therebetween in consecutive order: one electrode layer; an electrochromic layer; an ion conductive layer; an optional counter electrode layer and another electrode layer, at least one of the electrode layers being transparent and each electrode layer being in contact with a respective one of the substrates, the ion conductive layer being adapted to communicate ions to and from the electrochromic layer upon application of a voltage across the electrode layers. According to this aspect, the ion conductive layer comprises the polyether-functional liquid electrolyte described above.

Advantageously, the electrolyte of the present invention is a viscous liquid so that it can easily be applied to one of the layers of the electrochromic device before they are assembled. Additionally, the electrolyte is capable of subsequently solidifying when exposed to moisture (i.e., at the exposed edges) so as to avoid problems associated with containment of liquid or gel electrolytes. Looking to electrochromic device 10 of FIG. 1, after electrode layer 18 is applied to substrate 22, a layer of the electrolyte of this invention can be applied to layer 18 or to an optional counter electrode layer 30. Subsequently a substrate layer 20 carrying an electrode layer 16 having thereon an electrochromic material layer 12 would be assembled as in FIG. 1 to sandwich the electrolyte layer 14 in the device. The electrolyte along the outer edges, when exposed to moisture, crosslinks to form a solid material at the outer perimeter of the device which acts to contain the liquid electrolyte in place within the device and advantageously maintains the device as a rigid unit. Still further, this crosslinked material acts as a barrier to substantially prevent any additional moisture from contacting the bulk of the liquid electrolyte within the device. The electrodes are provided with external electrical leads 24 and 26 connected to a voltage providing source 28. Application of a voltage of proper polarity across the electrodes causes coloration of the electrochromic layer.

Another advantage of the liquid electrolyte of the present invention is that the epoxide and amine groups employed in its formation provide adhesion properties to the electrolyte and the crosslinked electrolyte material which aid in maintaining the adjacent layers of the device in intimate and fixed contact therewith.

The electrolyte of the present invention advantageously is a transparent electrolyte which would find use in those electrochromic devices which, during operation thereof, need to be transparent. Still further, the electrolyte of the present invention exhibits excellent ionic conductivity.

DETAILED DESCRIPTION OF PREFERRED EMBODIMENTS

Figure 1:
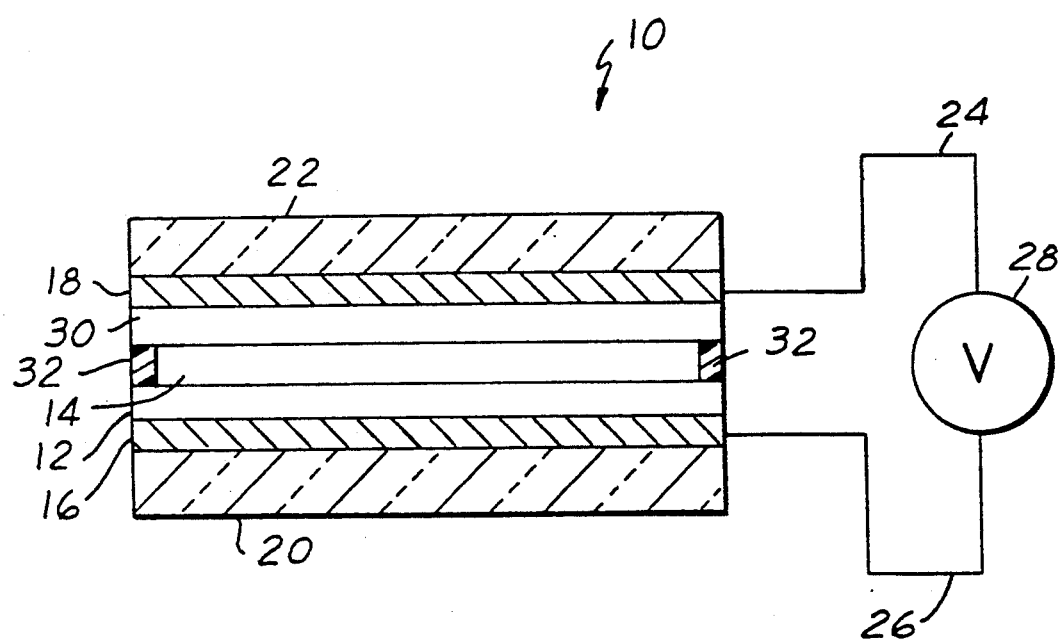
FIG. 1 is a cross-sectional view of a electrochromic device which may employ the polyether-functional liquid electrolyte of the present invention.

This invention is directed to a polyether-functional liquid electrolyte adapted for use in an electrochromic device. The electrolyte comprises the reaction product of materials comprising: (i) liquid polyether polyamine having at least two reactive amine groups and containing polyether groups, and (ii) liquid mono-epoxide silane having at least one hydrolyzable group attached to a silicon atom.

The polyether polyamine comprises at least two reactive amine groups. According to this invention, a reactive amine group is one individually selected from secondary (having one active hydrogen) or primary (having two active hydrogens) amine groups. The polyether polyamine may thus contain, for example, three secondary amine groups, a secondary and a primary amine group, two primary amine groups and a tertiary amine group, or two primary amine groups. Mixtures of polyamines as described above could also be employed in this invention as the polyether polyamine reactant. Most preferably, the polyether polyamine is a diamine, more preferably comprising amine groups located near or at the ends of the molecule with a series of polyether units therebetween. Preferably both of the amine groups are primary amine groups (hence terminal amine groups), since such groups are more reactive. As is known to those skilled in the art, such polyether polyamines may be of various molecular weights. Preferably for use in this invention, such polyether polyamines have molecular weights between about 200 and about 4000, and contain generally at least about 4 repeating ether moieties such as ($-CH_2CH_2O-$) or ($-CH_2CH_3CHO-$) per molecule. Such moieties are believed to provide the ionic conductivity to the electrolyte.

The amine polyether may be of any molecular weight as long as it is a liquid at about room temperature. Generally, such amine polyethers have between about 4 and about 80 polyether units. The polyether polyamine polyether may include non-interfering functionality such as Si in the molecule. Exemplary of such polyether polyamine compounds (often called polyoxyalkyleneamines) which may be employed herein are polyoxypropylenediamines and polyoxypropylenetriamines. Polyoxypropylenediamines, e.g., polyoxy(methyl-1,2-ethanediyl), alpha-(2-aminomethylethyl), omega-(2-aminomethylethyl)ether are commercially available as the Jeffamine series (trademark, Texaco Chemical Co., Bellaire, Tex.) including Jeffamine D-2000, Jeffamine D-4000, Jeffamine D-400, and Jeffamine D-230. Polyoxypropylenetriamines, e.g., polyoxy(methyl-1,2-ethanediyl), alpha-hydro-omega-(2-aminomethyl-ethoxy)ether is commercially available as the Jeffamine series (trademark, Texaco Chemical Co.) including Jeffamine T-403, Jeffamine T-3000, and Jeffamine T-5000. The most preferred polyether polyamine compound is Jeffamine D-4000.

The mono-epoxide hydrolyzable silane employed in the present invention has at least one hydrolyzable group attached to the silicon atom, more preferably two and most preferably three hydrolyzable groups attached to the silicon atom, which may be the same or different hydrolyzable groups. Generally, all of the hydrolyzable groups on the silicon atom will be the same hydrolyzable group. The hydrolyzable group may be any of the many known hydrolyzable groups, e.g., alkoxyalkyleneoxy and alkoxy groups, still others being apparent to one skilled in the art in view of the present disclosure. Preferably the one or more hydrolyzable groups present in the silane are selected from alkoxy groups, more preferably being selected from alkoxy groups having from 1 to 5 carbon atoms. The mono-epoxide hydrolyzable silane may also contain one or more ether linkages in the molecule as well as other non-interfering functionalities. The mono-epoxide hydrolyzable silane may be of any molecular weight as long as it is a liquid at about room temperature. Exemplary of hydrolyzable silanes which may be employed in the present invention are glycidoxypropyltrimethoxysilane, glycidoxybutyltrimethoxysilane, methyl(glycidoxypropyl)diethoxysilane, dimethyl(glycidoxypropyl)methoxysilane and phenyl(glycidoxybutyl)dimethoxysilane.

The polyether polyamine and mono-epoxide hydrolyzable silane are combined in the reaction mixture and reacted in amounts so as to provide at least about 2 moles of the silane per mole of the polyamine. That is, according to the present invention sufficient silane is provided so as to react at least each of two reactive amine groups with an epoxide group of the mono-epoxide hydrolyzable silane. That is, each polyether polyamine molecule will react with at least two molecules of silane. When the polyether polyamine contains, e.g., at least one primary amine group, the silane may be provided in an amount greater than about 2 molecules per molecule of the polyamine, i.e., to react more than just one of the active amine hydrogens of a primary amine group.

Generally, if it is desired to react all of the active amine hydrogens, it is preferable to provide the silane in an amount in slight excess of that required to react all active amine hydrogens to ensure such reactions. It is preferable to use polyether polyamines having two primary amine groups per polyamine molecule and employ sufficient silane to react all four active amine hydrogens per such molecule. The resulting polyether compound will contain four silane units (each having at least one and up to three hydrolyzable groups) and desirably the compound will cure more readily when exposed to moisture and form a material with a greater crosslink density.

According to one embodiment of a method for making a polyether-functional liquid electrolyte according to the present invention, the polyether polyamine and mono-epoxide hydrolyzable silane would be mixed to form a reaction mixture. The reaction mixture is then mixed for a time at a temperature sufficient to cause reaction of epoxide groups of the silane and the reactive amine groups of the polyamine to form the electrolyte of this invention. The temperature of the reaction mixture may be elevated to speed the epoxide-amine reaction.

This electrolyte is capable of conducting ions, e.g., alkali metal ions during use in a device such as an electrochromic device. These ions may be provided from an adjacent component of the device or be Provided by incorporating such ions into the electrolyte during its manufacture. In the former instance, the electrochromic material layer may be formulated so as to contain the ionic species which will migrate into the electrolyte when the device is in operation. In the preferred latter instance, alkali metal salts may be incorporated into the reaction mixture electrolyte. Exemplary of alkali metal salts which may be so employed in forming the electrolyte are chlorides, nitrates, sulfates and perchlorates of alkali metals, i.e., such salts as lithium chloride, sodium nitrate, sodium sulfate, and lithium perchlorate. Lithium salts are preferred because they exhibit, in general, higher ionic conductivity. The amount of alkali metal salt which may be incorporated into the electrolyte may vary and will be dependent on such factors as the particular application of the electrolyte and the type of salt incorporated. For example, it has been found that when a lithium salt is employed, it is preferably incorporated in amounts so as to provide between about 0.125 and about 0.025 lithium ions per ether group in the electrolyte. That is, the preferred amount of salt is that which allows for between about 8 and 40 ether groups per lithium ion. The optimal amount of salt to be incorporated will be apparent to one skilled in the art in view of the present disclosure.

Certain salts, e.g., lithium salts are more easily incorporated into the reaction mixture when dissolved first in a solvent. Exemplary of solvents which may be so employed are alcohols, ethers, ketones, aromatic hydrocarbons, phthalates, as well as compatible mixtures thereof, with alcohols being preferred. Exemplary of useful alcohols are butanol, isopropanol, hexanol, methanol, ethanol and the like, with methanol being preferred. Ethers which may be used include, but are not limited to, propylene glycol methyl ether, dipropylene glycol methyl ether and ethylene glycol ether acetate, with the cellosolve type ethers being preferred. Ketones which may be so employed include methyl butyl ketone, methylisobutyl ketone, methyl propyl ketone, methyl ethyl ketone, etc. Blends of such solvents may thus be employed as the solvent in this invention. While solvents which may be used have been disclosed above, this disclosure is not meant to be limiting. Other suitable organic solvents which may be used will be apparent to those skilled in the art in view of the present disclosure.

Optional materials which may be included in the reaction mixture include alpha-alumina or cab-o-sil or other well known materials which act as inert fillers to give more mechanical stability and to increase the viscosity.

If a solvent has been employed in forming the electrolyte, substantially all of the solvent should be removed. This may be done by vacuum evaporation, heating under a dry atmosphere, or under flowing hot dry air. Preferably, the solvent should be removed soon after the electrolyte is formed since organic solvents like alcohol often incorporate water and would thus increase the likelihood that some crosslinking of the electrolyte would take place. It is undesirable to encourage crosslinking in the bulk of the electrolyte since crosslinking decreases ionic conductivity. For this reason, the electrolyte is generally formed under anhydrous conditions.

While numerous polyether polyamines, mono-epoxy silanes and alkali metal salts which may be employed in the present invention to make the electrolyte have been disclosed herein, still other such materials useful in this invention will be apparent to those skilled in the art in view of the present disclosure.

The electrodes used in the electrochromic device of this invention may be any material which is electronically conductive. At least one of the electrode-substrate combinations is transparent, although both may be. If it is intended that the electrode be a light transmitting electrode, there may be used a light transmitting film of an electrically conductive metal oxide such as doped or undoped tin oxide, indium oxide, zinc oxide and the like. The thickness of the transparent electrode layer generally falls within the range of 200 nm to several microns, correspondingly varying in transparency and resistance.

The transparent electrode layer may be formed on the substrates, either of items 20 and 22 of FIG. 1 by any known technique, including vacuum evaporation, chemical vapor deposition, sol-gel deposition, ion plating, reactive sputtering, etc. The substrates, at least one of which is transparent, can be plastic, quartz, glass, etc. The transparent electrode layer may be formed by the so-called thick film processes such as screen printing or coating. When one of the thick batch film processes is used, (1) a paste containing metal compound micro particles or (2) a solution of an organic metal compound such as metal alcoholate or its oligomer is coated and sintered to form the transparent electrode layer. Preferably, the transparent electrode material is tin oxide doped with fluorine. The non-transparent electrode material selected from light-reflecting electrode materials (e.g., Al, Ag, Pt or Ni) or other electrode materials (e.g., Au, Pd, Cr, Ir, Ru, Rh or C).

The electrochromic layer may be selected from any electrochromic material, many of which are well known to those skilled in the art and commercially available. Cathodic electrochromic materials include non-stoichiometric (i.e., oxygen deficient) metal oxides wherein the metal has variable oxidation states. Exemplary of such cathodic electrochromic materials useful in this invention are those selected from the group comprising tungsten oxide, molybdenum oxide, vanadium oxide, titanium oxide, lead oxide, and bismuth oxide and compatible mixtures of any of them. Anodic electrochromic materials which may be used in this invention include fully oxidized compounds comprising metal wherein the metal has variable oxidation states. Exemplary of such anodic electrochromic materials are Prussian blue, iridium oxide and nickel hydroxide and compatible mixtures of any of them. Preferred electrochromic materials for use in electrochromic devices of this invention include non-stoichiometric, oxygen deficient tungsten oxide as the cathodic electrochromic material and fully oxidized iridium oxide as an anodic electrochromic material.

Usually the thickness of the electrochromic layer is between about 0.1 and 100 microns. However, since a small potential will provide an enormous field strength across very thin films, films of 0.1–10 microns thickness are preferred over thicker ones. Optimal thickness also will be determined by the material of the film. The electrochromic layer may be provided on the electrode layer by any suitable technique, for example, by vacuum deposition, chemical vapor deposition, electrolytic, thermal evaporation, and the like. Selection of the optimal electrochromic material and method of its deposition will be apparent to those skilled in the art in view of the present disclosure.

In the embodiment of the device shown in FIG. 1, the device could be formed by applying a layer of electrolyte material 14 made according to an embodiment of the present invention, between electrochromic layer 12 and electrode 18. That is, a layer of the polyether-functional liquid electrolyte could be deposited directly on, e.g., either electrode layer 18 or optionally on the counter electrode layer 30 or electrochromic material layer 12 and thereafter the device could be assembled as shown. The thickness of the electrolyte layer may vary widely. Selection of the optimal thickness will be apparent to one skilled in the art in view of the present disclosure. The desired thickness of electrolyte layer is obtained by assembling the device with spacers 32 at the four corners of the device. The spacers can be made from any inert material such as certain types of plastics and one example used in this application are small pieces of glass. The spacers should be as small as possible to obtain the desired result. The spacers used herein each had an area of 1 square millimeter. Following assembly, the exposed edges of the electrochromic material would be exposed to moisture for a time sufficient to allow for adequate crosslinking of these edges of the electrolyte; this time is on the order of several hours. When the edges of the electrolyte crosslink and form a solid material, the adjacent layers (e.g., the electrochromic material and the electrode) are laminated together by the material.

As will be apparent to one skilled in the art in view of the present disclosure, such crosslinking takes place in two steps. First, hydrolyzable groups of the silane react with water to form —OH groups on the silicon atom and generate alcohol which evaporates, and subsequently these —OH groups condense, liberating water and forming the —Si—O—Si— crosslink. The crosslinked material at the outer edges also acts as a barrier to penetration of moisture into the bulk of the electrolyte. Thus crosslinking is limited substantially to the outermost edges of the electrolyte as is desired, since crosslinking decreases the ionic conductivity of the electrolyte. This sealed device can be readily handled without affecting the integrity of the device. Should it later be desired to further seal the edges for example, with polybutylene, so as to provide an air tight seal against moisture, it can easily be provided to the assembled device.

As would be apparent to those skilled in the art in view of the present disclosure, the electrochromic device of this invention employing the polyether-functional liquid electrolyte may comprise other components, e.g., counter electrodes, a second electrochromic layer, etc. Counter electrodes are generally employed between the ion conductive layer and an electrode of the device (i.e., as shown in layer 30 between ion conductive layer 14 and electrode layer 18 of the device of FIG. 1) to improve operation of the device. A counter electrode may be formed of, e.g., a fully oxidized $WO_3$ or $V_2O_5$. This counter electrode material is generally not meant to be electrochromic.

While this invention has been found to be particularly useful in electrochromic devices, its use is not to be limited to electrochromic devices. The flexible, solid electrolyte of the invention may be used in any application wherein this type of electrolyte would be suitable, e.g., in a battery or chemical sensor.

The invention will be further understood by referring to the following detailed examples which exemplify embodiments of polyether-functional liquid electrolytes made according to the present invention. It should be understood that the specific examples are presented by way of illustration and not by way of limitation.

EXAMPLE 1

In a 250 cc glass jar, 40 g (0.01 moles) polyoxypropylenediamine, M.W.=4000, (Jeffamine D-4000, trademark) and 11.8 g (0.05 moles) -glycidoxypropyltrimethoxysilane (purchased from Petrach Systems, Bristol, Penna.) were added to form a reaction mixture. This reaction mixture was heated to 80° C. and stirred for 2.5 hours at this temperature to speed the epoxide-amine reaction and form the electrolyte according to an embodiment of this invention. Then 6.9 g (0.1 moles) of lithium nitrate dissolved in 32.0 g (1 mole) of methanol was added to the reaction mixture with stirring. The alkali salt doped electrolyte was then vacuum dried at 80° C. for 120 minutes to remove substantially all of the alcohol. Since the product is very hydroscopic, it was thereafter stored in a closed container with dessicant.

Some of the doped electrolyte was then provided as a layer approximately 0.1 mm thick onto a vanadium oxide counter electrode layer applied to an electrode adhered to a glass substrate (corresponding to counter electrode layer 30 applied to conductive layer 18 adhered to substrate 22 of FIG. 1). A tungsten oxide electrochromic layer applied to an electrode adhered to another glass substrate (corresponding to electrochromic layer 12 applied to conductive layer 16 adhered to substrate 20 of FIG. 1) was used to press the electrolyte layer flat and complete the electrochromic device. The device was allowed to sit in air for 3-4 hours during which time the exposed edges of the electrolyte absorbed atmospheric moisture and crosslink, sealing the edges of the device. The electrolyte was a transparent liquid. The electrode layers of the device were connected to a voltage source and subjected to cycling. The device performed well during cycling.

The electrolyte exhibits excellent ionic conductivity of about $5.5 \times 10^{-4}$ $(ohm^{-1})(cm^{-1})$ at room temperature.

EXAMPLE 2

Generally following the procedure of Example 1, 3 g (0.02 moles) polyoxyethylenediamine, M.W.=148, (Jeffamine EDR-148, trademark) and 19.7 g (0.08 moles) 2-(3,4-epoxycyclohexyl)ethyltrimethoxysilane are combined in a 250 cc glass jar. This reaction mixture is heated to 90° C. and stirred for 3.0 hours at this temperature to speed the epoxide-amine reaction and form the electrolyte according to an embodiment of this invention. Then 13.8 g (0.2 moles) of lithium nitrate dissolved in 64.0 g (2 moles) of methanol is added to the reaction mixture with stirring. The alkali salt doped electrolyte is then vacuum dried at 70° C. for 120 minutes to remove substantially all of the alcohol. Since the product is very hydroscopic, it is thereafter stored in a closed container with dessicant until use.

The doped electrolyte is then provided as a layer approximately 0.2 mm thick between a vanadium oxide electrode layer and a tungsten oxide electrochromic layer as in Example 1 to form an electrochromic device. The device is allowed to sit in air for 3-4 hours during which time the exposed edges of the electrolyte absorb atmospheric moisture and crosslink, sealing the edges of the device. The electrolyte is a transparent liquid. The electrode layers of the device are connected to a voltage source and subjected to cycling. The device performs well during cycling.

The electrolyte exhibits excellent ionic conductivity of about $6.5 \times 10^{-4}$ $(ohm^{-1})(cm^{-1})$ at room temperature.

EXAMPLE 3

Generally following the procedure of Example 1, 40 g (0.02 moles) polyoxypropylenediamine, M.W.=2000, Jeffamine D-2000, trademark) and 24.8 g (0.10 moles) 3-glycidoxypropylmethyldiethoxysilane are combined in a glass jar. This reaction mixture is heated to 100° C. and stirred for 2.0 hours at this temperature to speed the epoxide-amine reaction and form the electrolyte according to an embodiment of this invention. Then 13.8 g (0.2 moles) of lithium nitrate dissolved in 82 g (2 moles) of acetonitrile is added to the reaction mixture. The alkali salt doped electrolyte is then vacuum dried at 80° C. for 180 minutes to remove substantially all of the alcohol. Since the product is very hydroscopic, it is thereafter stored in a closed container with dessicant until use.

The doped electrolyte is then provided as a layer approximately 0.15 mm thick between a vanadium oxide electrode layer and a tungsten oxide electrochromic layer as in Example 1 to form an electrochromic device. The device is allowed to sit in air for 3-4 hours during which time the exposed edges of the electrolyte absorb atmospheric moisture and crosslink, sealing the edges of the device. The electrolyte is a transparent liquid. The electrode layers of the device are connected to a voltage source and subjected to cycling. The device performs well during cycling.

The electrolyte exhibits excellent ionic conductivity of about $5.9 \times 10^{-4}$ $(ohm^{-1})(cm^{-1})$ at room temperature.

EXAMPLE 4

Generally following the procedure of Example 1, 30 g (0.01 moles) polyoxypropylenetriamine, M.W.=3000, (Jeffamine T-3000, trademark) and 8.7 g (0.04 moles) 3-glycidoxypropylmethylethoxysilane are combined in a 400 cc flask. This reaction mixture is heated to 80° C. and stirred for 2.5 hours at this temperature to speed the epoxide-amine reaction and form the electrolyte according to an embodiment of this invention. Then 1.7 g (0.03 of sodium chloride dissolved in 32.0 g (1 mole) of methanol is added to the reaction mixture with stirring. The alkali salt doped electrolyte is then vacuum dried under nitrogen at 100° C. for 240 minutes to remove substantially all of the alcohol. Since the product is very hydroscopic, it is thereafter stored in a closed container with dessicant until use.

The doped electrolyte is then generally provided as a layer approximately 0.2 mm thick between a polypyrrole electrode layer and a molybdenum oxide electrochromic layer as in Example 1 to form an electrochromic device. The device is allowed to sit in air for 4-5 hours during which time the exposed edges of the electrolyte absorb atmospheric moisture and crosslink, sealing the edges of the device. The electrolyte is a transparent liquid. The electrode layers of the device are connected to a voltage source and subjected to cycling. The device performs well during cycling.

The electrolyte exhibits excellent ionic conductivity of about $3.2 \times 10^{-4}$ $(ohm^{-1})(cm^{-1})$ at room temperature.

EXAMPLE 5

Generally following the procedure of Example 1, 4.4 g (0.01 moles) polyoxypropylenetriamine, M.W.=440, (Jeffamine T-440, trademark) and 7.4 g (0.03 moles) 2-(3,4-epoxycyclohexyl)ethyltrimethoxysilane are combined in a 200 cc glass beaker to form a reaction mixture. This reaction mixture is heated to 100° C. and stirred for 2.0 hours at this temperature to speed the epoxide-amine reaction and form the electrolyte according to an embodiment of this invention. Then 4.25 g (0.05 moles) of sodium nitrate dissolved in 32.0 g (1 mole) of methanol is added to the reaction mixture with stirring. The alkali salt doped electrolyte is then vacuum dried at 70° C. for 240 minutes to remove substantially all of the alcohol. Since the product is very hydroscopic, it is thereafter stored in a closed container with dessicant until use.

The doped electrolyte is then provided as a layer approximately 0.1 mm thick between a vanadium oxide electrode layer and a tungsten oxide electrochromic layer as in Example 1 to form an electrochromic device. The device is allowed to sit in air for 4–5 hours during which time the exposed edges of the electrolyte absorb atmospheric moisture and crosslink, sealing the edges of the device. The electrolyte is a transparent liquid. The electrode layers of the device are connected to a voltage source and subjected to cycling. The device performs well during cycling.

The electrolyte exhibits excellent ionic conductivity of about $1.2 \times 10^{-4}$ (ohm$^{-1}$)(cm$^{-1}$) at room temperature.

EXAMPLE 6

Generally following the procedure of Example 1, 4 g (0.01 moles) polyoxypropylenediamine, M.W.=400, (Jeffamine D-400, trademark) and 11.8 g (0.05 moles) 3-glycidoxypropyltrimethoxysilane are combined in a 250 cc glass jar to form a reaction mixture. This reaction mixture is heated to 80° C. and stirred for 2.5 hours at this temperature to speed the epoxide-amine reaction and form the electrolyte according to an embodiment of this invention. Then 3 g (0.03 moles) of Potassium nitrate dissolved in 64.0 g (2 moles) of methanol is added to the reaction mixture with stirring. The alkali salt doped electrolyte is then vacuum dried at 80° C. for 180 minutes to remove substantially all of the alcohol. Since the product is very hydroscopic, it is thereafter stored in a closed container with dessicant until use.

The doped electrolyte is then provided as a layer approximately 0.15 mm thick between a polypyrrole electrode layer and a tungsten oxide electrochromic layer as in Example 1 to form an electrochromic device. The device is allowed to sit in air for 4–5 hours during which time the exposed edges of the electrolyte absorb atmospheric moisture and crosslink, sealing the edges of the device. The electrolyte is a transparent liquid. The electrode layers of the device are connected to a voltage source and subjected to cycling. The device performs well during cycling.

The electrolyte exhibits excellent ionic conductivity of about $4.5 \times 10^{-5}$ (ohm$^{-1}$)(cm$^{-1}$) at room temperature.

EXAMPLE 7

Generally following the procedure of Example 1, 4.6 g (0.02 moles) polyoxypropylenediamine, M.W.=230, (Jeffamine D-230, trademark) and 22.9 g (0.08 moles) 2-(3,4-epoxy-4-methylcyclohexyl)propylmethyldiethoxysilane are combined in a 500 cc flask. This reaction mixture is heated to 70° C. and stirred for 4.0 hours at this temperature to speed the epoxide-amine reaction and form the electrolyte according to an embodiment of this invention. Then 5.3 g (0.05 moles) of lithium perchlorate dissolved in 32.0 g (1 mole) of methanol is added to the reaction mixture with stirring. The alkali salt doped electrolyte is then vacuum dried at 80° C. for 120 minutes to remove substantially all of the alcohol. Since the product is very hydroscopic, it is thereafter stored in a closed container with dessicant until use.

The doped electrolyte is then provided as a layer approximately 0.15 mm thick between a vanadium oxide electrode layer and a tungsten oxide electrochromic layer as in Example 1 to form an electrochromic device. The device is allowed to sit in air for 4–5 hours during which time the exposed edges of the electrolyte absorb atmospheric moisture and crosslink, sealing the edges of the device. The electrolyte is a transparent liquid. The electrode layers of the device are connected to a voltage source and subjected to cycling. The device performs well during cycling.

The electrolyte exhibits excellent ionic conductivity of about $3.5 \times 10^{-4}$ (ohm$^{-1}$)(cm$^{-1}$) at room temperature.

EXAMPLE 8

Generally following the procedure of Example 1, 40 g (0.02 moles) of polyoxypropylenediamine, M.W.=2,000 (Jeffamine D-2000, trademark) and 24.8 g (0.10 moles) of 3-glycidoxypropylmethyldiethoxysilane are combined in a 250 cc glass jar. This reaction mixture is heated to 100° C. and stirred for 2.0 hours at this temperature to speed the epoxide-amine reaction and form the electrolyte according to an embodiment of this invention.

This electrolyte is then provided as a layer approximately 0.15 mm thick between a lithium doped vanadium oxide electrode layer and a lithium doped tungsten oxide electrochromic layer to form an electrochromic device. The device is allowed to sit in air for 24 hours during which time the exposed edges of the electrolyte absorbs atmospheric moisture and crosslinks, sealing the edges of the device. More time is necessary to allow the electrolyte to crosslink in this example as compare to those above, since the electrolyte of this example is not predoped with alkali metal salt which tends to be hydroscopic and hence aids in providing moisture for the crosslinking reaction.

The electrolyte is a transparent liquid. The electrode layers of the device are connected to a voltage source and subjected to cycling. The device performs well during cycling.

The electrolyte exhibits excellent ionic conductivity of about $5.4 \times 10^{-4}$ (ohm$^{-1}$)(cm$^{-1}$) at room temperature.

In view of the disclosure, many modifications of this invention will be apparent to those skilled in the art. It is intended that all such modifications which fall within the true scope of this invention be included within the terms of the appended claims.

I claim:

1. A self-sealing, polyether-functional liquid electrolyte which comprises an alkali metal salt incorporated into the reaction product of materials comprising:
   (i) liquid polyether diamine having two reactive amine groups and containing polyether groups, and
   (ii) liquid mono-epoxide hydrolyzable silane having at least one hydrolyzable group attached to a silicon atom.

2. The self-sealing, polyether-functional liquid electrolyte according to claim 1, wherein said polyether diamine and said mono-epoxide silane are reacted in amounts so as to provide at least about 2 molecules of said mono-epoxide silane per molecule of said polyether diamine.

3. The self-sealing, polyether-functional liquid electrolyte according to claim 1, wherein said alkali metal salt is selected from salts of lithium and sodium.

4. The self-sealing, polyether-functional liquid electrolyte according to claim 1, wherein said alkali metal salt is a selected from nitrates, sulfates and perchlorates of alkali metals.

5. The self-sealing, polyether-functional liquid electrolyte according to claim 1, wherein said alkali metal salt is incorporated into said electrolyte dissolved in an organic solvent.

6. The self-sealing, polyether-functional liquid electrolyte according to claim 5, wherein said organic solvent is an alcohol.

7. The self-sealing, polyether-functional liquid electrolyte according to claim 1, wherein said diamine contains at least one primary amine group.

8. The self-sealing, polyether-functional said electrolyte according to claim 1, wherein said diamine contains two primary amine groups.

9. The self-sealing, polyether-functional liquid electrolyte according to claim 1, wherein said polyether diamine and said mono-epoxide silane are reacted in amounts so as to provide at least about 1 molecule of said mono-epoxide silane per each active amine hydrogen present on said polyether diamine.

10. The self-sealing, polyether-functional liquid electrolyte according to claim 1, wherein said polyether diamine contains between about 4 and about 80 polyether moietes selected from ($-CH_2CH_2O-$) and ($-CH_2CH_3CHO-$).

11. The self-sealing, polyether-functional liquid electrolyte according to claim 1, wherein said hydrolyzable groups of said mono-epoxy silane are alkoxy groups.

12. The self-sealing, polyether functional liquid electrolyte according to claim 1, wherein said alkoxy groups contain up to about 5 carbon atoms.

13. The self-sealing, polyether-functional liquid electrolyte according to claim 1, wherein said mono-epoxide silane contains three hydrolyzable groups attached to said silicon atom.

14. The self-sealing, polyether-functional liquid electrolyte according to claim 1, wherein said silane contains ether linkages.

15. A method for making a self-sealing polyether-functional liquid electrolyte which method comprises:
   combining materials comprising (i) liquid polyether diamine having two reactive amine groups and containing polyether groups; and (ii) liquid mono epoxide silane having at least one hydrolyzable group attached to a silicon atom to form a reaction mixtures;
   mixing said reaction mixture for a time sufficient to cause reaction of said epoxide groups of said mono-epoxy hydrolyzable silane with said reactive amine groups of said polyether diamine to form said polyether-functional liquid electrolyte; and
   incorporating an alkali metal salt into said reaction mixture.

16. The method according to claim 15, wherein said polyether diamine and said mono-epoxide silane are combined in amounts so as to provide at least about 2 molecules of said mono-epoxide silane per molecule of said polyether diamine.

17. The method according to claim 15, further comprising heating said reaction mixture.

18. The self-sealing, polyether-functional liquid electrolyte made according to the method of claim 15.

19. The self-sealing, polyether-functional liquid electrolyte made according to the method of claim 16.

20. The self-sealing, polyether-functional liquid electrolyte made according to the method of claim 17.

21. A self-sealing, polyether-functional liquid electrolyte which comprises an alkali metal salt incorporated into the reaction product of materials comprising:
   (i) liquid polyether diamine having two primary amine groups and containing polyether groups, and
   (ii) liquid mono-epoxide hydrolyzable silane having ether linkages and three hydrolyzable groups attached to a silicon atom;
wherein said polyether diamine and said mono-epoxide silane are reacted in amounts so as to provide at least about 2 molecules of said mono-epoxide silane per molecule of said polyether diamine.

* * * * *